US011785386B2

(12) United States Patent
Pye et al.

(10) Patent No.: US 11,785,386 B2
(45) Date of Patent: Oct. 10, 2023

(54) MULTISTEP SOUND PREFERENCE DETERMINATION

(71) Applicant: HARMAN INTERNATIONAL INDUSTRIES, INCORPORATED, Stamford, CT (US)

(72) Inventors: Daniel Timothy Pye, San Francisco, CA (US); Michael Edmund Knappe, West Bloomfield, MI (US); Kevin Hague, San Jose, CA (US); Sean E. Olive, Oak Park, CA (US); Omid Khonsaripour, Thousand Oaks, CA (US); Todd Welti, Thousand Oaks, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 590 days.

(21) Appl. No.: 16/730,455

(22) Filed: Dec. 30, 2019

(65) Prior Publication Data

US 2020/0221229 A1 Jul. 9, 2020

Related U.S. Application Data

(60) Provisional application No. 62/788,104, filed on Jan. 3, 2019.

(51) Int. Cl.
*H04R 1/22* (2006.01)
*H04R 5/04* (2006.01)
*G06F 16/783* (2019.01)

(52) U.S. Cl.
CPC .......... *H04R 5/04* (2013.01); *G06F 16/7834* (2019.01); *G06F 16/7844* (2019.01); *H04R 1/22* (2013.01)

(58) Field of Classification Search
CPC ... G06F 3/04847; G06F 3/04842; H03G 3/02; H03G 5/165; H04R 3/04; H04R 1/22; H04S 7/307; H04L 67/34; G09G 5/006
See application file for complete search history.

(56) References Cited

U.S. PATENT DOCUMENTS

| 2011/0135103 A1* | 6/2011 | Sun | .................. H04R 29/00 |
| | | | 381/58 |
| 2014/0194775 A1* | 7/2014 | Van Hasselt | ........... A61B 5/123 |
| | | | 381/98 |

FOREIGN PATENT DOCUMENTS

WO 2014/049148 A1 4/2014

OTHER PUBLICATIONS

Extended European Search Report for application No. 20150162.4 dated Jun. 3, 2020.
(Continued)

*Primary Examiner* — Thomas H Maung
(74) *Attorney, Agent, or Firm* — Artegis Law Group, LLP

(57) ABSTRACT

An embodiment sets forth a technique for configuring one or more audio parameters. The technique includes presenting a first plurality of setting options associated with an audio parameter, wherein the first plurality of setting options comprises a first option having a same value as a first setting of the audio parameter and a second option having a first value different than the first setting; receiving a selection of one of the first option and the second option; based on the selection, presenting a second plurality of setting options associated with the audio parameter, wherein the second plurality of setting options comprises a third option having a same value as a second setting of the audio parameter and a fourth option having a second value different than the second setting; and setting the audio parameter based on a selection of at least one of the second plurality of setting options.

19 Claims, 10 Drawing Sheets

(56) References Cited

OTHER PUBLICATIONS

Olive et al.,"Factors that Influence Listeners Preferred Bass and Treble Balance in Headphones", Audio Engineering Society, Convention Paper 9382, 2015, 12 pages.
Unpublished PCT application No. PCT/US2019/048918 Filed on Aug. 29, 2019, 38 pages.
Welti et al.,"A Comparison of Test Methodologies to Personalize Headphone Sound Quality", Audio Engineering Society, Convention Paper 10247, 2019, 10 pages.

* cited by examiner

|  | Treble -6 | Treble -3 | Treble 0 | Treble +3 | Treble +6 |
|---|---|---|---|---|---|
| Bass -6 | -6, -6 | -6, -3 | -6, 0 | -6, +3 | -6, +6 |
| Bass -3 | -3, -6 | -3, -3 | -3, 0 | -3, +3 | -3, +6 |
| Bass 0 | 0, -6 | -0, -3 | 0, 0 | 0, +3 | 0, +6 |
| Bass +3 | +3, -6 | +3, -3 | +3, 0 | +3, +3 | +3, +6 |
| Bass +6 | +6, -6 | +6, -3 | +6, 0 | +6, +3 | +6, +6 |

|  | Treble -6 | Treble -3 | Treble 0 | Treble +3 | Treble +6 |
|---|---|---|---|---|---|
| Bass -6 | -6, -6 | -6, -3 | -6, 0 | -6, +3 | -6, +6 |
| Bass -3 | -3, -6 | -3, -3 | -3, 0 | -3, +3 | -3, +6 |
| Bass 0 | 0, -6 | ~~0, -3~~ | ~~0, 0~~ | ~~0, +3~~ | 0, +6 |
| Bass +3 | +3, -6 | ~~+3, -3~~ | +3, 0 | +3, +3 | +3, +6 |
| Bass +6 | +6, -6 | ~~+6, -3~~ | +6, 0 | +6, +3 | +6, +6 |

|  | Treble -6 | Treble -3 | Treble 0 | Treble +3 | Treble +6 |
|---|---|---|---|---|---|
| Bass -6 | -6, -6 | -6, -3 | -6, 0 | -6, +3 | -6, +6 |
| Bass -3 | -3, -6 | -3, -3 | -3, 0 | -3, +3 | -3, +6 |
| Bass 0 | 0, -6 | ~~0, -3~~ | ~~0, 0~~ | ~~0, +3~~ | 0, +6 |
| Bass +3 | +3, -6 | ~~+3, -3~~ | ~~+3, 0~~ | ~~+3, +3~~ | +3, +6 |
| Bass +6 | +6, -6 | ~~+6, -3~~ | ~~+6, 0~~ | +6, +3 | +6, +6 |

|  | Treble -6 | Treble -3 | Treble 0 | Treble +3 | Treble +6 |
|---|---|---|---|---|---|
| Bass -6 | -6, -6 | -6, -3 | -6, 0 | -6, +3 | -6, +6 |
| Bass -3 | -3, -6 | -3, -3 | -3, 0 | -3, +3 | -3, +6 |
| Bass 0 | 0, -6 | ~~0, -3~~ | ~~0, 0~~ | ~~0, +3~~ | ~~0, +6~~ |
| Bass +3 | +3, -6 | ~~+3, -3~~ | ~~+3, 0~~ | ~~+3, +3~~ | +3, +6 |
| Bass +6 | +6, -6 | ~~+6, -3~~ | ~~+6, 0~~ | ~~+6, +3~~ | ~~+6, +6~~ |

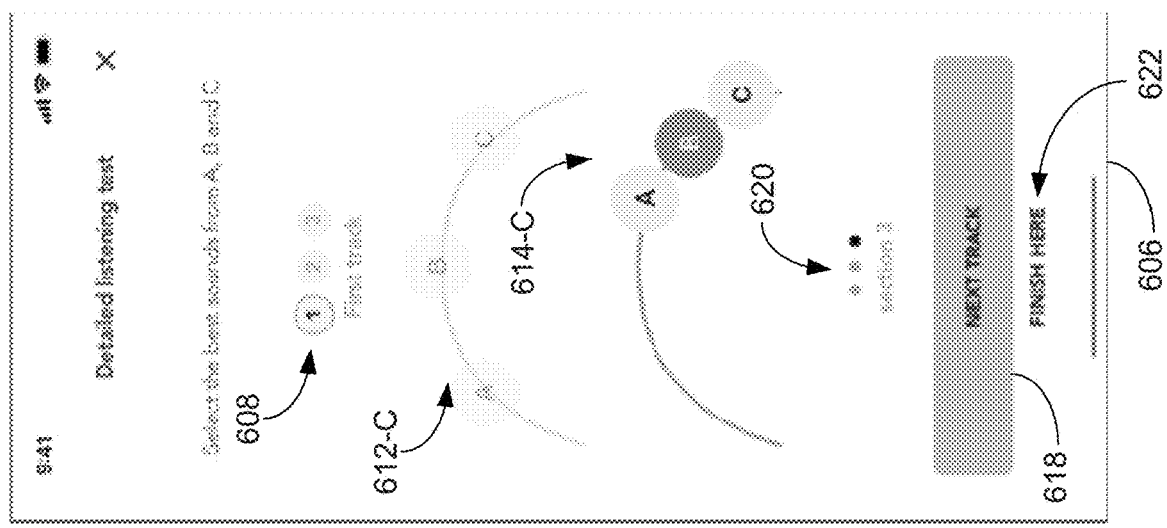
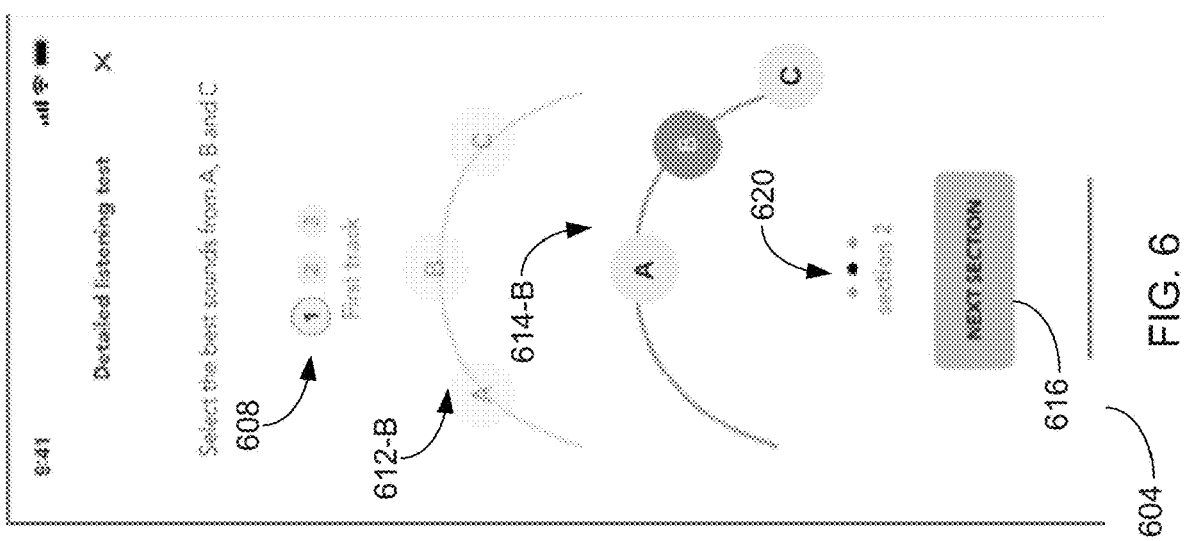
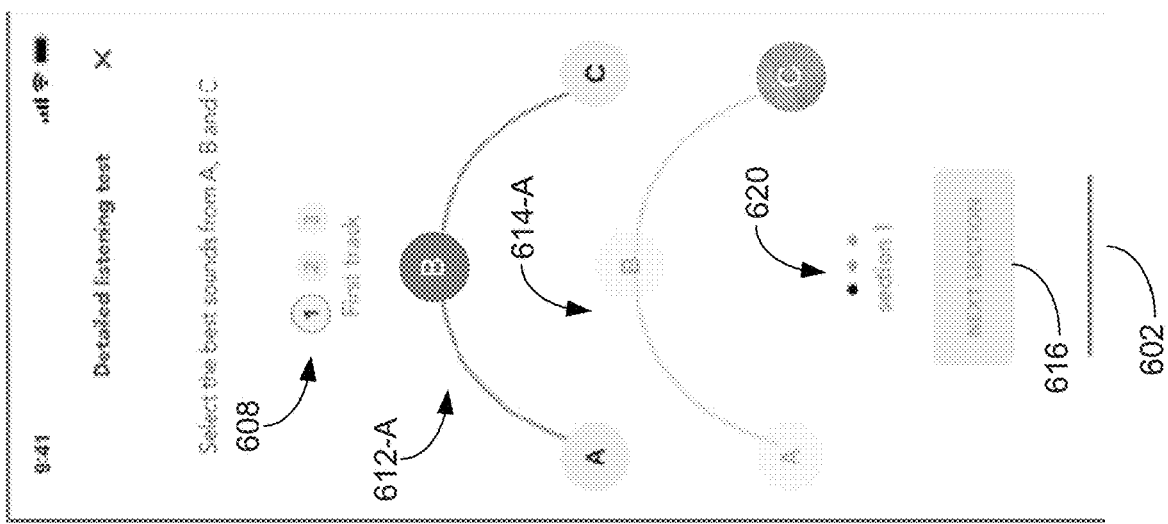
FIG. 6

MULTISTEP SOUND PREFERENCE DETERMINATION

CROSS-REFERENCE TO RELATED APPLICATIONS

This application claims the benefit of the U.S. Provisional application titled "MULTISTEP SOUND PREFERENCE DETERMINATION," filed on Jan. 3, 2019, and having Ser. No. 62/788,104. The subject matter of this application is hereby incorporated herein by reference in its entirety.

BACKGROUND

Field of the Various Embodiments

The disclosed embodiments relate generally to audio processing, and in particular, to a multistep sound preference determination.

Description of the Related Art

The technology of audio devices, including audio output devices, has progressed over time to provide numerous device options for users to enjoy audio content. As a result, users have many devices to choose from for playing audio content, including for example home audio systems, in-vehicle audio systems, portable media devices, smartphones, computers, speaker systems, and headphones of both the in-ear and over-ear varieties.

To facilitate the enjoyment of audio content via an audio output device, the audio output device may include adjustable parameters that affect the output of the audio content. For example, an audio output device may include adjustable equalization parameters, such as bass and treble. Typically, the controls for adjusting these parameters for an audio output device involve simple dials and/or sliders that can be manually manipulated by the users. A drawback of this approach is that the manual adjustment approach includes an indefinite number of possible adjustments. As a result, the manual adjustment approach is largely trial and error, which can be time consuming and tedious. A further drawback of this approach is that such manual adjustment often requires expert-level knowledge about the parameters and their effects on audio output. This knowledge level can be overwhelming to a non-expert user. In response to the knowledge level requirements and the indefinite number of possible adjustments, a non-expert user may forego any adjustment to the audio parameters, which may decrease her enjoyment of audio content.

As the foregoing illustrates, what is needed are more effective techniques for configuring and personalizing audio parameters for an audio device.

SUMMARY

One embodiment sets forth a method for configuring one or more audio parameters. The method includes presenting a first plurality of setting options associated with an audio parameter, wherein the first plurality of setting options comprises a first option having a same value as a first setting of the audio parameter and a second option having a first value different than the first setting; receiving a selection of one of the first option and the second option; based on the selection, presenting a second plurality of setting options associated with the audio parameter, wherein the second plurality of setting options comprises a third option having a same value as a second setting of the audio parameter and a fourth option having a second value different than the second setting; and setting the audio parameter based on a selection of at least one of the second plurality of setting options.

Further embodiments provide, among other things, a system and one or more non-transitory computer readable media configured to implement the method set forth above.

An advantage and technological improvement of the disclosed techniques is that a personalized audio parameter may be derived and configured systematically and in a targeted manner. Accordingly, the audio parameters may be set in a more efficient and effective manner. Another advantage and technological improvement is that a baseline for audio parameters may be refined based on personalized audio parameters. The refined baseline may be distributed and applied to audio devices associated with different users.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIGS. 4A-4D illustrate matrixes of options in a round robin-based process for configuring one or more audio parameters, according to one or more aspects of the various embodiments;

FIG. 6 illustrates further examples of user interfaces for presenting options for configuring one or more audio parameters, according to one or more aspects of the various embodiments;

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
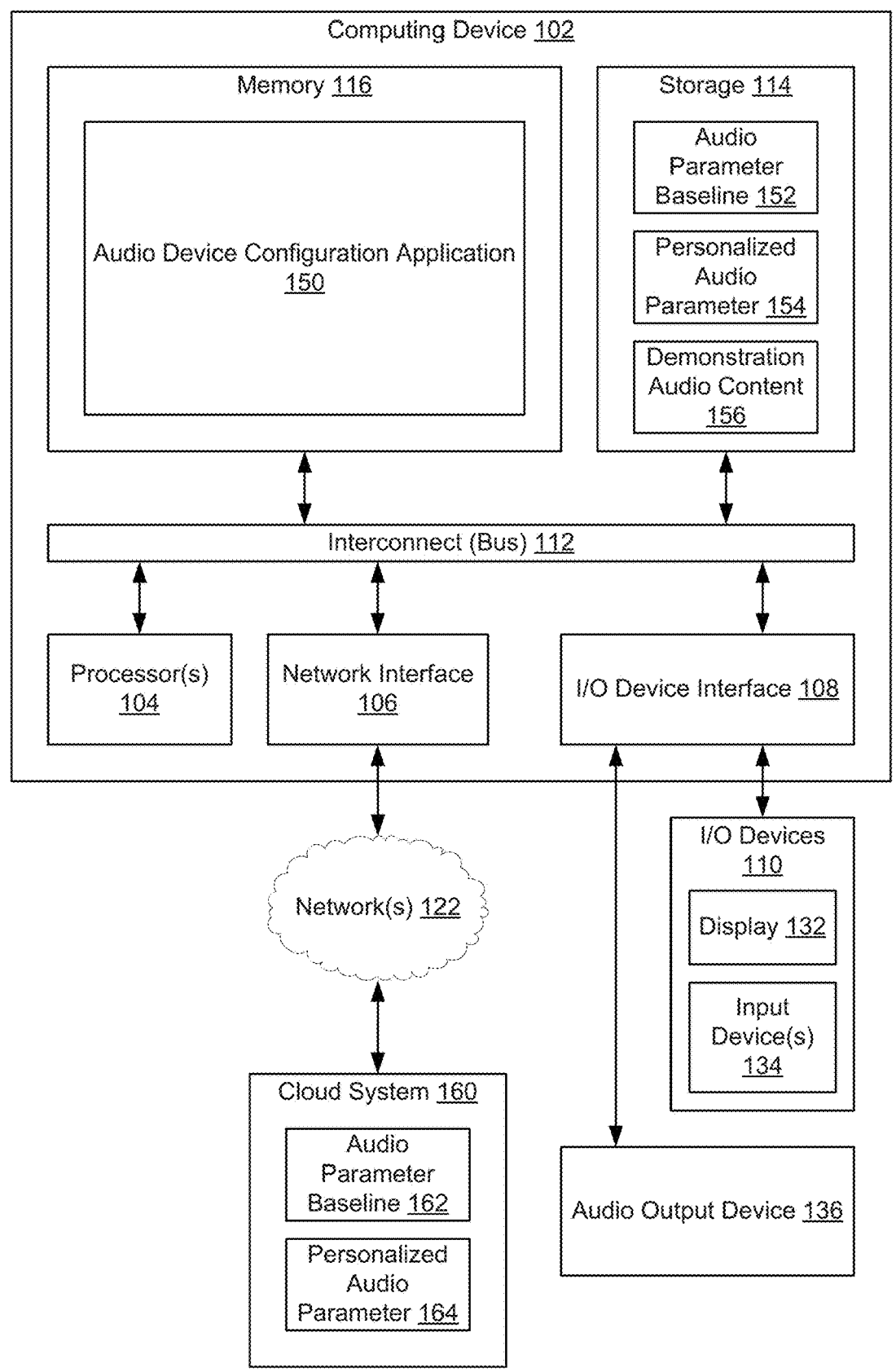
FIG. 1 illustrates a computing device configured to implement one or more aspects of the various embodiments.

FIG. 1 illustrates a computing device 102 configured to implement one or more aspects of the various embodiments. Computing device 102 is configured to run an audio device configuration application 150 that resides in a memory 116. It is noted that computing device 102 described herein is illustrative and that any other technically feasible configurations fall within the scope of the various embodiments.

As shown, computing device 102 includes, without limitation, an interconnect (bus) 112 that connects one or more processor(s) 104, an input/output (I/O) device interface 108 coupled to an audio output device 136 and one or more other input/output (I/O) devices 110, memory 116, a storage 114, and a network interface 106. Processor(s) 104 may be any suitable processor, such as a central processing unit (CPU), a graphics processing unit (GPU), an application-specific integrated circuit (ASIC), a field programmable gate array (FPGA), any other type of processing unit, or a combination of processing units, such as a CPU configured to operate in conjunction with a GPU. In general, processor(s) 104 may be any technically feasible hardware unit capable of processing data and/or executing software applications, including audio device configuration application 150.

An audio output device 136 may include any device that is capable of outputting audio signals received from a source as sound waves into an environment. The audio output device 136 may be implemented in any number of forms, including but not limited to discrete speaker devices, on-device speakers (e.g., speakers integrated with another device), headphones and headsets (in-ear or over-the-ear), soundbars, and smart speakers. In some embodiments, speakers 136 may include directional speakers and/or speaker arrays. Audio output device 136 may be coupled to I/O device interface 108 via a wired (e.g., High Definition Multimedia Interface (HDMI), Universal Serial Bus (USB), headphone cable) and/or wireless (e.g., Bluetooth, Wi-Fi) connection.

Other I/O devices 110 may be coupled to I/O device interface 108 and may include devices capable of providing input and/or output. In various embodiments, other I/O devices 110 include a display 132 and one or more input devices 134. I/O devices 110 may be coupled to I/O device interface 108 via a wired (e.g., HDMI, USB) and/or wireless (e.g., Bluetooth, Wi-Fi) connection.

Display device 132 may display visual content (e.g., images, video, etc.) to users of computing device 102. In various embodiments, display device 132 is a display device (e.g., liquid-crystal display (LCD) screen, light-emitting diode (LED) display screen, organic light-emitting diode (OLED) display screen, a two-dimensional or three-dimensional projection system, etc.) configured to output visual content received from a source (e.g., from computing device 102). Display device 132 may be a display integrated with computing device 102 or a separate display device coupled to computing device 102.

Input devices 134 include devices capable of providing inputs to computing device 102. In some embodiments, input devices 134 include one or more of: a keyboard, a mouse, a touch-sensitive screen, a touch-sensitive pad, buttons, knobs, dials, joysticks, and so forth. In some embodiments, input devices 134 may include a microphone capable of capturing sound waves occurring in the environment to generate an audio signal from the captured sound waves. The microphone may include an omnidirectional microphone, a microphone array, or other transducers or sensors capable of converting sound waves into an electrical audio signal.

Storage 114 may include non-volatile storage for applications and data and may include fixed or removable disk drives, flash memory devices, and CD-ROM, DVD-ROM, Blu-Ray, HD-DVD, or other magnetic, optical, or solid state storage devices. Audio device configuration application 150 may reside in storage 114 and may be loaded into memory 116 when executed. Additionally, in various embodiments, audio parameter baseline 152, personalized audio parameter 154, and demonstration audio content 156 may be stored in storage 114.

Audio parameter baseline 152 stores information regarding baseline and/or default values for one or more audio parameters. The audio parameters may include, without limitation, bass level, treble level, frequency response levels for different frequency bands, and other audio equalization parameters. The audio parameter values may be relative (e.g., plus or minus values relative to an initial or baseline value) and/or absolute values (e.g., an amplitude value or level for tones in the bass range or the treble range). In some embodiments, audio parameter baseline 152 includes a model of audio parameters. The model represents a relationship between demographic characteristics (e.g., age, sex, years of audio listening experience) and values for the audio parameters. Baseline values may be derived for one or more audio parameters from the model given demographic information associated with a user. In some embodiments, audio parameter baseline 152 may include predefined default values (absolute or relative values) for one or more audio parameters. In some embodiments, the model and/or the default values may be predefined based on empirical research and testing (e.g., by a manufacturer or implementer of audio output device 136, by a developer or implementer of audio device configuration application 150). Audio parameter baseline 152 may be obtained by and/or provided to computing device 102. For example, audio parameter baseline 152 may be stored in storage 114 along with installation of audio device configuration application 150 into computing device 102. Additionally or alternatively, audio parameter baseline 152 may be obtained from cloud system 160 (e.g., as a copy of audio parameter baseline 162 stored at cloud system 160).

Personalized audio parameter 154 stores values for one or more audio parameters that are personalized to a user. Personalized audio parameter 154 may be set using an audio parameter configuration process, further details of which are described below. Personalized audio parameter 154 may be associated with a profile of the user and distributed to one or more of audio output devices 136 associated with the user via I/O device interface 108 and/or networks 122 and cloud system 160. Personalized audio parameter 154 may be first set for one audio output device 136 and then associated with the user. Further, in some embodiments, personalized audio parameter 154 may be transmitted to cloud system 160 for storage as personalized audio parameter 164 associated with the user.

Demonstration audio content 156 includes one or more media content items (e.g., an audio content item) that has been preselected or predetermined. Demonstration audio content 156 may be stored in storage 114 along with installation of audio device configuration application 150 and/or obtained from cloud system 160. In some embodiments, demonstration audio content 156 includes one or more media content items, each of which has at least one of the properties of exhibiting a broad range of bass, treble, and/or other audio parameters; and exhibiting perceivable substantial changes in bass, treble, and/or other audio parameters when output via an audio output device 136. Demonstration audio content 156 is preselected or predetermined (e.g., by the developer, implementer, or distributor of audio device configuration application 150) for having one or more of these properties. Demonstration audio content 156 may be stored in any technically feasible format (e.g., way file, mp3 file, lossless audio, etc.). Demonstration audio content 156 may be played back by audio device configuration application 150 and output via audio output device 136 to demonstrate, via the audio output, the effect of current values for one or more audio parameters and changes to those parameters.

Memory 116 may include a random access memory (RAM) module, a flash memory unit, or any other type of memory unit or combination thereof. Processing unit(s) 104, I/O device interface 108, and network interface 106 are configured to read data from and write data to memory 116. Memory 116 includes various software programs (e.g., an operating system, one or more applications) that can be executed by processor(s) 104 and application data associated with said software programs, including audio device configuration application 150.

Audio device configuration application 150 is configured to implement a process flow and associated user interface(s) for configuring one or more audio parameters. Audio device configuration application 150 configures one or more audio parameters (e.g., bass, treble) for an audio output device 136 based on audio parameter baseline 152 and selections of options for modifying the audio parameter from audio parameter baseline 152. The process flow, and the corresponding user interface(s), implemented by audio device configuration application 150 present modification options iteratively, with one or more rounds of iterations and/or one or more rounds of round robin selections. Audio device configuration application 150 is further configured to play a media content item included in demonstration audio content 156 based on audio parameter baseline 152 and/or the different modification options, so that the user can hear a demonstration of audio parameter baseline 152 and the different modification options. The process flow implemented by audio device configuration application 150 is further described below. Audio device configuration application 150 may present the user interfaces via display 132 and/or audio output device 136, and play demonstration audio content 156 via audio output device 136.

Network(s) 122 may be any technically feasible type of communications network that allows data to be exchanged between computing device 102 and other systems (e.g., a web server, a database server, another networked computing device or system), including cloud system 160. In some embodiments, networks 122 include one or more of a local area network (LAN), a campus area network (CAN), a wide area network (WAN), and the Internet. Computing device 102 may connect with networks 122 via network interface 106. In some embodiments, network interface 106 is hardware, software, or a combination of hardware and software, that is configured to connect to and interface with networks 122.

Cloud system 160 may be a computing system or device (e.g., a database server or other server) at which personalized audio parameters 164 may be stored and processed, and from which an audio parameter baseline 162 may be distributed. Cloud system 160 is accessible to computing device 102 via networks 122. Audio parameter baseline 162 stores a distributable and updatable version of audio parameter baseline 152. Audio parameter baseline 162 may be distributed to any number of computing devices 102, to update audio parameter baseline 152 stored in storage 114. In various embodiments, cloud system 160 may update audio parameter baseline 162 (e.g., with personalized audio parameter data 154 from computing devices 102, based on data gathered from empirical research). Audio parameter baseline 162 may be updated using any technically feasible technique (e.g., with machine learning-based techniques, manually). Personalized audio parameter 164 stores personalized audio parameters 154 of multiple users. Personalized audio parameter 164 includes associations between those personalized audio parameters and corresponding user profiles. Computing device 102 may obtain personalized audio parameter 164 associated with a user of computing device 102 for storage in storage 114 as personalized audio parameter 154.

As described above, for an audio device (e.g., audio output device 136), one or more audio parameters may be adjusted to affect the output of audio content by the audio device. Audio parameters may be adjusted to personalize the characteristics of audio output by the audio device. Audio parameters that may be adjusted include, for example, bass and treble. In conventional approaches for adjusting audio parameters, a device and/or an application may include manual controls for adjusting one or more audio parameters. However, these conventional approaches have an indefinite amount of adjustment choices and require expert-level knowledge for effective adjustment, both of which can overwhelm and confuse the user.

To address these issues, in various embodiments, audio device configuration application 150 implements a process flow for configuring one or more audio parameters in a guided manner. Audio device configuration application 150 implements the process flow via associated user interfaces, in which a number of options representing changes or no change to an audio parameter are presented. Based on a selection, audio device configuration application 150 presents further options representing further change or no change to the audio parameter. Accordingly, audio device configuration application 150 may present the options via an iterative decision flow. In some embodiments, audio device configuration application 150 may present a first process flow for configuring a first audio parameter, and then a second process flow for configuring as second audio parameter, and so on. In some other embodiments, audio device configuration application 150 may present a process flow for configuring two or more parameters (e.g., combining the process flows for the first and the second audio parameters into one).

Figure 2:
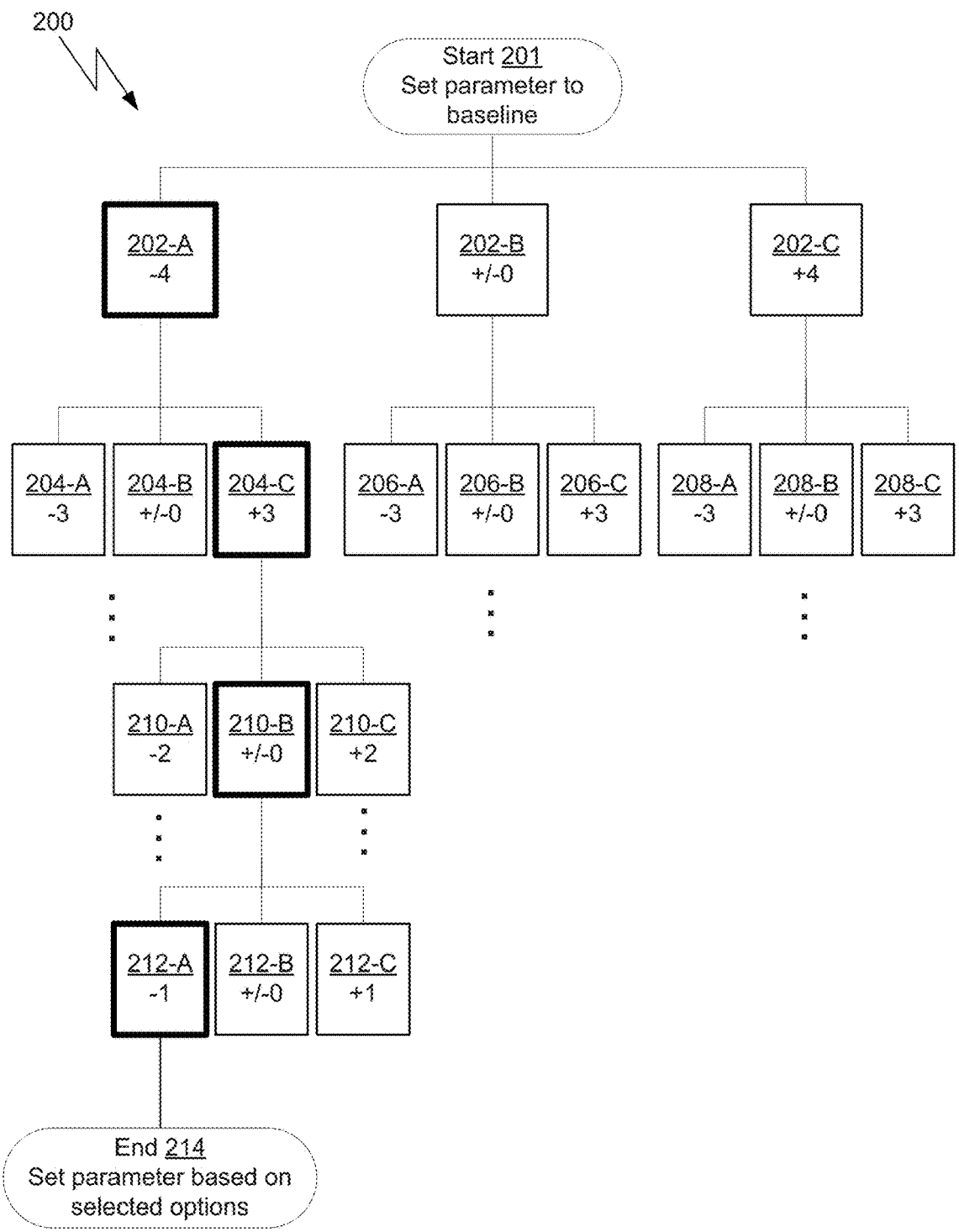
FIG. 2 illustrates a decision flow of selection options in a process for configuring one or more audio parameters, according to one or more aspects of the various embodiments.

FIG. 2 illustrates a decision flow 200 of selection options in a process flow for configuring one or more audio parameters, according to one or more aspects of the various embodiments. In some embodiments, the process flow for configuring an audio parameter includes one round that includes a predefined number of iterations, where the predefined number is two or more. In each iteration, three selection options are presented. The options presented in one iteration includes a first option corresponding to no change, a second option corresponding to a change of +X, where X is a predefined amount, and a third option corresponding to a change of −X. The amount of X decreases (e.g., incrementally, by predefined amounts, by a predefined function) from one iteration to the next. After the iterations, the audio parameter may be set based on selections through the iterations reflecting a cumulative amount of change from an initial value. These features are shown in decision flow 200, which illustrates an example of the three-options-per-iteration process flow.

Decision flow 200 begins at start 201, where the audio parameter is set to an initial value. In some embodiments, at start 201, the audio parameter is set to a baseline based on audio parameter baseline 152. Setting the audio parameter based on audio parameter baseline 152 may include obtaining user information from the user (e.g., user demographic information) and applying a model to the user information to obtain an initial value. Alternatively, setting the audio parameter based on audio parameter baseline 152 may include obtaining a predefined default value from audio parameter baseline 152 and setting that default value as the initial value.

After the parameter is set to an initial value to start the round, audio device configuration application 150 presents a first iteration of options. The first iteration includes options 202-A, 202-B, and 202-C. As shown in FIG. 2, option 202-A corresponds to a change of −4 from the current value of the audio parameter (which, at this point, is the initial value), option 202-B corresponds to a change of +/−0 (i.e., no change) from the current value, and option 202-C corresponds to a change of +4 from the current value. Audio device configuration application 150 may also play demonstration audio content 156 according to the current value. At the first iteration, the user may select any of the options 202. In response, audio device configuration application 150 may play demonstration audio content 156 with a value of the audio parameter based on the selected option and option(s) selected in previous (if any) iterations. For example, in decision flow 200, option 202-A is selected, as indicated by the bolded borders of the block for option 202-A. In response to selecting option 202-A, audio device configuration application 150 may play demonstration audio content 156 with the value of the audio parameter being −4 from the initial value. After selecting an option 202, the user may advance to the next iteration (e.g., by selecting a "next" button or option, or the like).

Decision flow 200 also shows options that may be presented in a second iteration based on the option selected in the first iteration. In the second iteration, the changes to which the options correspond include −3, +/−0, and +3. The change (or lack thereof) in the second iteration is cumulative, relative to the initial value, with whatever change (or lack thereof) the user selected in the first iteration. For example, if the user advances to the second iteration with option 202-A selected in the first iteration, the options presented in the second iteration include options 204-A (−3), 204-B (+/−0), and 204-C (+3), and the change or lack thereof in these options are cumulative, relative of the initial value, with the change of −4 from option 202-A. If the user advances to the second iteration with option 202-B selected in the first iteration, the options presented in the second iteration include options 206-A (−3), 206-B (+/−0), and 206-C (+3), and the change or lack thereof in these options are cumulative, relative of the initial value, with the change of +/−0 from option 202-B. If the user advances to the second iteration with option 202-C selected in the first iteration, the options presented in the second iteration include options 208-A (−3), 208-B (+/−0), and 208-C (+3), and the change or lack thereof in these options are cumulative, relative of the initial value, with the change of +4 from option 202-C. Again, in response to selection of an option in the second iteration, audio device configuration application 150 may play demonstration audio content 156 with a value of the audio parameter based on the selected option and option(s) selected in previous iterations. As shown in FIG. 2, decision flow 200 advances to a third iteration with option 204-C selected.

In the third iteration, the changes to which the options correspond include −2, +/−0, and +2. The change (or lack thereof) in the third iteration is cumulative, relative to the initial value, with whatever change (or lack thereof) the user selected in the first and second iterations. Accordingly, if option 204-C was selected in the second iteration, the options presented in the third iteration include options 210-A (−2), 210-B (+/−0), and 210-C (+2), and the change or lack thereof in these options are cumulative, relative of the initial value, with the changes of −4 from option 202-A and +3 from option 204-C. In response to selection of an option in the second iteration, audio device configuration application 150 may play demonstration audio content 156 with a value of the audio parameter based on the selected option and option(s) selected in previous iterations. As shown in FIG. 2, decision flow 200 advances to a fourth iteration with option 210-B selected.

In the fourth iteration, the changes to which the options correspond include −1, +/−0, and +1. The change (or lack thereof) in the third iteration is cumulative, relative to the initial value, with whatever change (or lack thereof) the user selected in the first, second, and third iterations. Accordingly, if option 210-B was selected in the third iteration, the options presented in the fourth iteration include options 212-A (−1), 212-B (+/−0), and 212-C (+2), and the change or lack thereof in these options are cumulative, relative of the initial value, with the changes of −4 from option 202-A, +3 from option 204-C, and +/−0 from option 210-B. In response to selection of an option in the third iteration, audio device configuration application 150 may play demonstration audio content 156 with a value of the audio parameter based on the selected option and option(s) selected in previous iterations. As shown in FIG. 2, decision flow 200 advances to end 214 with option 212-A selected. At end 214 of decision flow 200, the audio parameter is set based on the accumulation of selected options through decision flow 200, namely options 202-A, 204-C, 210-B, and 212-A. The change from the initial value based on the accumulation of these selected options is the sum of −4, +3, +/−0, and −1, which equals −2 from the initial value. The sum reflects the convergence of the user's preferences through decision flow 200 to a desired amount of change. Accordingly, at end 214, the audio parameter may be set to −2 from the initial value. Audio device configuration application 150 may play demonstration audio content 156 with this set value as a demonstration of the audio parameter at this set value. At this point, the user may confirm the setting and save the set value into personalized audio parameter 154. The user may also have the set value applied to audio output device 136 or not yet. Further, the user may discard the set value and start the process flow over, in which case he may go through decision flow 200 again.

It should be appreciated that decision flow 200 as shown omits some branches of the decision flow for sake of brevity, but those omitted branches follow a similar pattern to those branches that are shown. Further, it should be appreciated that the number of iterations and the amount of change in the different iterations are examples, and different numbers of iterations and different amounts of change are possible. Further, it should be appreciated that, while the amount of X in each iteration decrements by 1 from the previous iteration (e.g., +/−4 in the first iteration, +/−3 in the second iteration, etc.), the amount of decrease in X from the previous iteration may be different (e.g., decrement by 1.5 per iteration, divide by 2 per iteration).

Further, it should be appreciated that decision flow 200 illustrates configuration of one audio parameter. For example, audio device configuration application 150 first presents the process flow, following decision flow 200, for configuring bass. After the base is configured, audio device configuration application 150 then presents a similar process flow for configuring treble. In some embodiments, audio device configuration application 150 may present both process flows concurrently, so that two audio parameters (e.g., bass and treble) may be configured concurrently, with three options for bass and three options for treble presented at each iteration.

In some embodiments, one or more of the iterations in decision flow 200 includes a fourth option along with the three options that may be presented in the iteration. The fourth option corresponds to an "I cannot tell the difference" response, in which the user is unable to perceive the difference resulting from the other three options in the iteration. The fourth option may be associated with a default amount of change (e.g., no change, a change toward the initial value by the same amount of X in the current iteration).

Figure 3A:
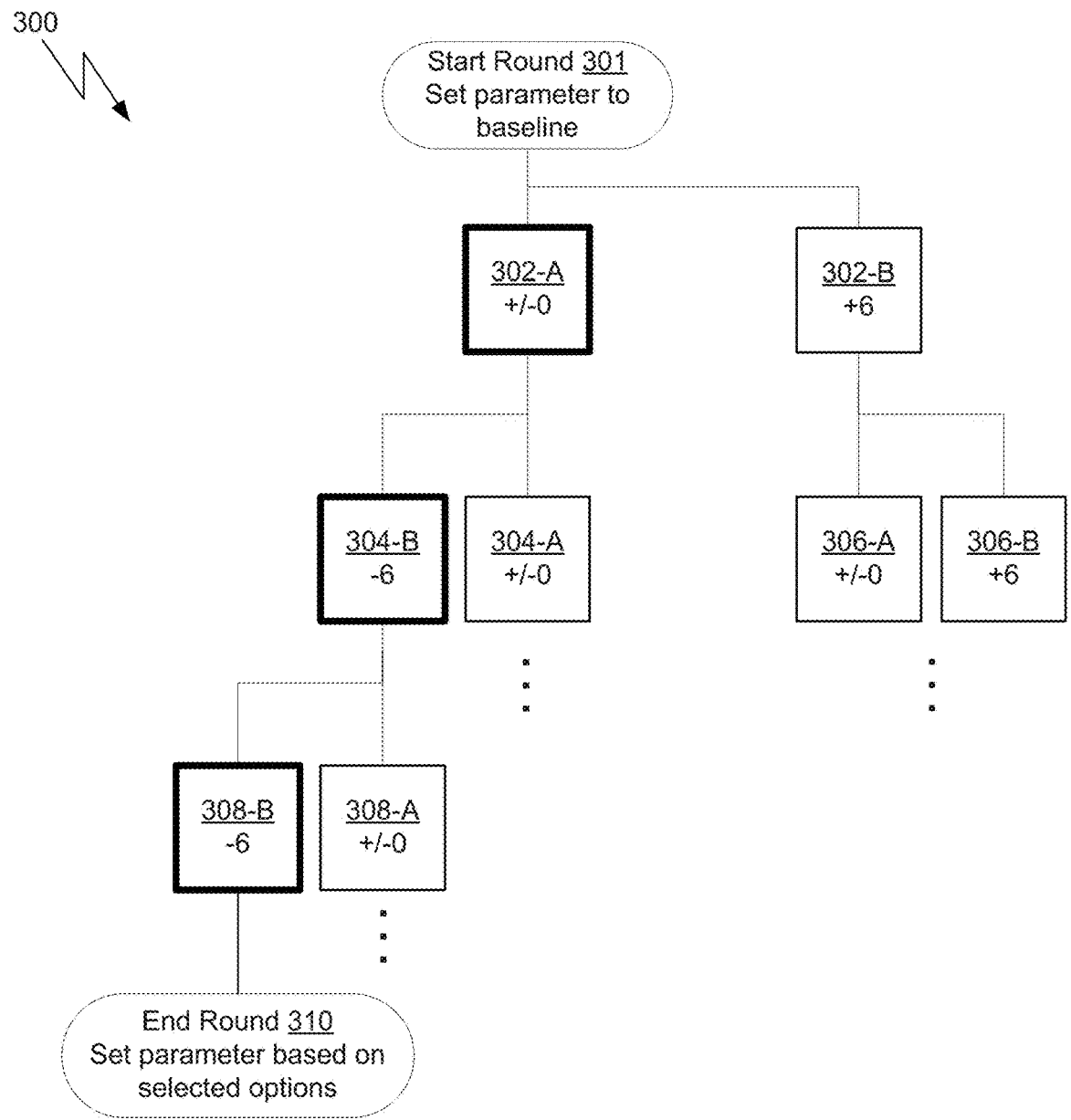
FIGS. 3A-3B illustrate decision flows of selection options in another process for configuring one or more audio parameters, according to one or more aspects of the various embodiments.
Figure 3B:
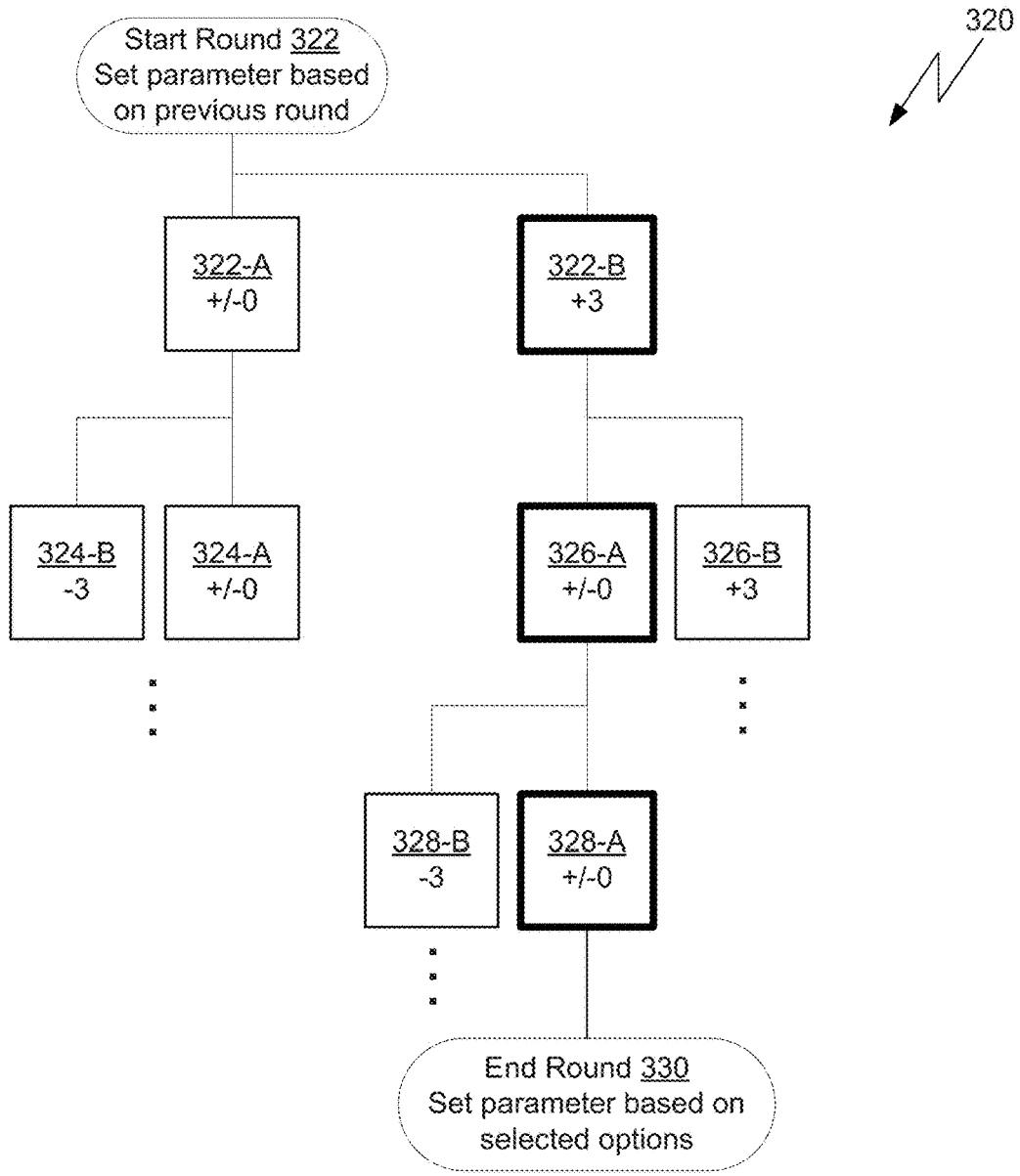

Decision flow 200, illustrated in FIG. 2, may set an audio parameter in one round. FIGS. 3A-3B illustrates decision flows for multiple rounds of a process flow for configuring an audio parameter. In FIGS. 3A-3B, in each iteration, two options are presented. The options presented in one iteration include a first option corresponding to no change and second option corresponding to a change of either +X or –X, where X is a predefined amount. The amount of X decreases (e.g., incrementally, by predefined amounts, by a predefined function) from one iteration to the next. After the iterations of one round, the audio parameter may be set based on selections through the iterations reflecting a cumulative amount of change from the value at the start of the round.

FIGS. 3A-3B illustrate decision flows of selection options in another process for configuring one or more audio parameters, according to one or more aspects of the various embodiments. FIG. 3A illustrates a decision flow 300 of a first round of multiple rounds in a process flow for configuring an audio parameter. Decision flow 300 begins at start round 301, where the audio parameter is set to an initial value. In some embodiments, at start round 301, the audio parameter is set to a baseline based on audio parameter baseline 152. Setting the audio parameter based on audio parameter baseline 152 may include obtaining user information from the user (e.g., user demographic information) and applying a model included in audio parameter baseline 152 to the user information to obtain an initial value. Alternatively, setting the audio parameter based on audio parameter baseline 152 may include obtaining a predefined default value from audio parameter baseline 152 and setting that default value as the initial value.

After the parameter is set to an initial value to start the round, audio device configuration application 150 presents a first iteration of options. The first iteration includes options 302-A and 302-B. As shown in FIG. 3A, option 302-A corresponds to a change of +/–0 (i.e., no change) from the current value of the audio parameter (which, at this point, is the initial value), and option 302-B corresponds to a change of +6. Audio device configuration application 150 may also play demonstration audio content 156 according to the current value. At the first iteration, the user may select any of the options 302. In response, audio device configuration application 150 may play demonstration audio content 156 with a value of the audio parameter based on the selected option and option(s) selected in previous (if any) iterations. For example, in decision flow 300, option 302-A is selected, as indicated by the bolded borders of the block for option 302-A. In response to selecting option 302-A, audio device configuration application 150 may play demonstration audio content 156 with the value of the audio parameter being +/–0 from the initial value. After selecting an option 302, the user may advance to the next iteration in the round (e.g., by selecting a "next" button or option, or the like).

Decision flow 300 also shows options that may be presented in a second iteration of the first round based on the option selected in the first iteration of the first round. In the second iteration of the first round, the changes to which the options correspond include +/–0, and either +3 or –3. The change (or lack thereof) in the second iteration is cumulative, relative to the value set at start 301 of the round, with whatever change (or lack thereof) the user selected in the first iteration. For example, if the user advances to the second iteration with option 302-A selected in the first iteration, the options presented in the second iteration include options 304-A (+/–0) and 304-B (–6), and the change or lack thereof in these options are cumulative, relative of the initial value, with the change of +/–0 from option 302-A. If the user advances to the second iteration with option 302-B selected in the first iteration, the options presented in the second iteration include options 306-A (+/–0) and 306-B (+6), and the change or lack thereof in these options are cumulative, relative of the initial value, with the change of +6 from option 302-B. Again, in response to selection of an option in the second iteration, audio device configuration application 150 may play demonstration audio content 156 with a value of the audio parameter based on the selected option and option(s) selected in previous (if any) iterations. As shown in FIG. 3A, decision flow 300 advances to a third iteration with option 304-B selected.

In the third iteration, the changes to which the options correspond include +/–0, and either +6 or –6. The change (or lack thereof) in the third iteration is cumulative, relative to the initial value, with whatever change (or lack thereof) the user selected in the first and second iterations. Accordingly, if option 304-B was selected in the second iteration, the options presented in the third iteration include options 308-A (+/–0) and 308-B (–6), and the change or lack thereof in these options are cumulative, relative of the initial value, with the changes of +/–0 from option 302-A and –6 from option 304-B. In response to selection of an option in the second iteration, audio device configuration application 150 may play demonstration audio content 156 with a value of the audio parameter based on the selected option and option(s) selected in previous iterations. As shown in FIG. 3A, decision flow 300 advances to end 310 of the first round with option 308-B selected.

At end 310 of decision flow 300, the audio parameter is set based on the accumulation of selected options through decision flow 300, namely options 302-A, 304-B, and 308-B. The change from the initial value based on the accumulation of these selected options is the sum of +/–0, –6, and –6, which equals –12 from the initial value. The sum reflects the convergence of the user's preferences through decision flow 300 to a desired amount of change. Accordingly, at end 310 of the first round, the audio parameter may be set to –12 from the initial value. Audio device configuration application 150 may play demonstration audio content 156 with this set value as a demonstration of the audio parameter at this set value. At this point, the user may advance to a second round in the process flow. Decision flow 320 (FIG. 3B) illustrates the decision flow of the second round.

FIG. 3B illustrates decision flow 320 of the second round of multiple rounds in the process flow for configuring an audio parameter. Decision flow 320 continues from end 310 of decision flow 300 of the first round. At start 322 of decision flow 320 of the second round, the audio parameter is set to an initial value of the round. The initial value of the second round is set as the value that was set at end 310 of the first round. Decision flow 320 flows similarly to decision 300, with the difference that options in decision flow 320 correspond to no change and a change by a smaller amount than the change in the first round. Thus, while in decision flow 300 options corresponding to a change correspond to either +6 or −6, in decision flow 320 options corresponding to a change correspond to either +3 or −3. Accordingly, in the first iteration of decision flow 320, the options presented include option 322-A (+/−0) and option 322-B (+3). The decrease in the amount of change from the first round to the second round may be predefined (e.g., decrement by a predefined amount, divide by a predefined amount).

Other than the amount of change (+/−3 vs. +/−6), decision flow 320 is similar to decision flow 300. For example, in the second iteration, options 324-A (+/−0) and 324-B (−3) follow from selection of option 322-A in the first iteration, and options 326-A (+/−0) and 326-B (+3) follow selection of option 322-B in the first iteration. In the third iteration, options 328-A (+/−0) and 328-B (−3) follow selection of option 326-A in the second iteration. At each iteration, audio device configuration application 150 may play demonstration audio content 156 with an audio parameter value based on the accumulation of current selections. At end 330 of the second round, with option 328-A selected, the audio parameter is set based on the accumulation of selected options through decision flow 320, namely options 322-B, 326-A, and 328-A. The change from the initial value of the second round based on the accumulation of these selected options is the sum of +3, +/−0, and +/−0, which equals +3 from the initial value of the second round. The sum reflects the convergence of the user's preferences through decision flow 320 to a desired amount of change. Accordingly, at end 330 of the second round, the audio parameter may be set to +3 from the value set at start 322 of the second round. Audio device configuration application 150 may play demonstration audio content 156 with this set value as a demonstration of the audio parameter at this set value. At this point, if the second round is the last round in the process flow, the user may confirm the setting and save the set value into personalized audio parameter 154. The user may also have the set value applied to audio output device 136 or not yet. Further, the user may discard the set value and start the process flow over, in which case he may go through decision flows 300 and 320 again. If the second round is not the last round, then a third round may start with the initial value of the third round set to the value that was set at end 330 of the second round. The decision flow for the third round will be similar to decision flows 300 and 320, but the amount of change will be smaller compared to the second round (e.g., +/−1.5 vs. +/−3).

Accordingly, FIGS. 3A-3B illustrates decision flows that apply a binary search process to configure an audio parameter. It should be appreciated that decision flows 300 and 320 as shown omits some branches of the decision flows for sake of brevity, but those omitted branches follow a similar pattern to those branches that are shown. Further, it should be appreciated that the number of iterations per round, the number of rounds, and the amount of change in the different rounds are examples, and different numbers of iterations and/or rounds, and different amounts of change are possible. Further, it should be appreciated that, while the amount of X in each round is obtained by dividing X in the previous round by 2 (e.g., +/−6 in the first round, +/−3 in the second round, etc.), the amount of decrease in X from the previous round may be different (e.g., decrement by 1 per round, divide by 1.5 per round).

Further, it should be appreciated that decision flows 300 and 320 illustrate configuration of one audio parameter. For example, audio device configuration application 150 first presents the process flow, following decision flows 300 and 320, for configuring bass. After the base is configured, audio device configuration application 150 then presents a similar process flow for configuring treble. In some embodiments, audio device configuration application 150 may present both process flows concurrently, so that two audio parameters (e.g., bass and treble) may be configured concurrently, with two options for bass and two options for treble presented at each iteration of each round.

In some embodiments, one or more of the iterations in decision flows 300 and 320 includes a third option along with the two options that may be presented in the iteration. The fourth option corresponds to an "I cannot tell the difference" response, in which the user is unable to perceive the difference resulting from the other two options in the iteration. The third option may be associated with a default amount of change (e.g., no change, a change toward the initial value by the same amount of X in the current round).

FIGS. 4A-4D illustrate matrixes of options in a round robin-based process for configuring one or more audio parameters, according to one or more aspects of the various embodiments. FIGS. 3A-3B illustrate an example process flow that applies a binary search process and in which the user is presented with two options at a time. FIGS. 4A-4D illustrate an example process flow that applies a multi-round, round robin-based process flow in which the user is also presented with two options at a time. Further, FIGS. 4A-4D illustrates a process flow in which two audio parameters (e.g., bass and treble) are configured concurrently.

The process flow of FIGS. 4A-4D begins with audio device configuration application 150 generating a set of possible values for the two audio parameters (e.g., bass and treble). Matrix 400, shown in FIGS. 4A-4D, illustrates the set of possible values. In matrix 400, the possible values for each parameter range from −6 to +6, in increments of 3, for a total of 25 value combinations. It should be appreciated that these values shown in matrix 400 are examples, and the range of values and the increments may differ in other implementations.

The process flow includes multiple rounds of round-robin. In the first round of round robin, the two audio parameters are set to initial values based on audio parameter baseline 152. Accordingly, the initial values may be derived from user information (to which a model included in audio parameter baseline 152 is applied) or predefined values included in audio parameter baseline 152. The values in matrix 400 closest to the initial values set based on audio parameter baseline 152 is set as the initial values for the first round. In matrix 400-A (FIG. 4A), those initial values are shown as the combination of bass +3 and treble +/−0, indicated in bold characters in matrix 400-A.

In each round, the user is presented with a round robin of option pairs, where the candidate value combinations for the pairs in the round include the initial value combination for the round and the value combinations immediately adjacent (vertically, horizontally, and diagonally) to that initial value combination in matrix 400, excluding any value combinations that have been rejected (i.e., offered to the user and not selected at least once) in previous rounds of round robin. In matrix 400-A, the candidate value combinations (i.e., the initial value combination and the adjacent value combinations) are shown in cells with bolded borders—there are nine candidate value combinations for the first round. Accordingly, in the first round, the round robin includes presentations of 36 pairs (9 choose 2) of candidate value combinations, where each candidate value combination competes with each other candidate value combination once. As with decision flows 200, 300, and 320 described above, with each pair audio device configuration application 150 may play demonstration audio content 156 based on the user's selection, and the user advances to the next pair by selecting a "next" option or the like. Audio device configuration application 150 keeps count of which candidate value combinations are selected within the round.

When a round is complete, the value combinations selected most frequently within the round is the winner of the round, and this value combination is set as the initial value combination for the next round. For example, in FIG. 4B, in matrix 400-B the value combination of bass +6 and treble +3 is the winner of the first round and is set as the initial value of the second round. Additionally, candidate value combinations that were not selected at all in the first round are rejected, as indicated by the crossed-out cells in matrix 400-B. The selection counts for the not-rejected candidate value combinations may be reset for the second round.

In the second round, the candidate value combinations are the initial value combination for the round (bass +6 and treble +3) and any non-rejected value combinations in matrix 400-B adjacent to the initial value combination, for a total of six candidate value combinations for the second round. In the second round, the round robin includes presentations of 15 pairs (6 choose 2) of candidate value combinations, where each candidate value combination competes with each other candidate value combination once. With each pair audio device configuration application 150 may play demonstration audio content 156 based on the user's selection, and the user advances to the next pair by selecting a "next" option or the like. Audio device configuration application 150 keeps count of which candidate value combinations are selected within the round. The combination of (bass +3 and treble +6) is the winner of the second round and is set as the initial value of the third round, as shown in matrix 400-C (FIG. 4C). Additional combinations are rejected in the second round, and are shown as crossed-out cells in matrix 400-C.

In the third round, the candidate value combinations are the initial value combination for the round (bass +3 and treble +6) and any non-rejected value combinations in matrix 400-C adjacent to the initial value combination, for a total of four candidate value combinations for the third round. In the third round, the round robin includes presentations of 6 pairs (4 choose 2) of candidate value combinations, where each candidate value combination competes with each other candidate value combination once. With each pair audio device configuration application 150 may play demonstration audio content 156 based on the user's selection, and the user advances to the next pair by selecting a "next" option or the like. Audio device configuration application 150 keeps count of which candidate value combinations are selected within the round. The combination of (bass +3 and treble +6) is the winner of the third round and is set as the initial value combination of the fourth round, as shown in matrix 400-D (FIG. 4D). In matrix 400-D, with the candidate value combinations rejected in the previous rounds all crossed out, there are no more value combinations in matrix 400 that are adjacent to the initial value combination for the round. As a result, audio device configuration application 150 stops the rounds of round robins and sets this initial value combination (bass +3 and treble +6) of what would have been the fourth round as the user's preference. As with the other examples described above, at this point, the user may confirm the setting and save the set value combination into personalized audio parameter 154. The user may also have the set value combination applied to audio output device 136 or not yet. Further, the user may discard the set value combination and start the process flow over, in which case he may go through the multiple rounds of round robin again.

As shown in FIGS. 2-4D described above, different process flows may be implemented to present options for configuring one or more audio parameters. Options may be presented to the user two or three at a time, and in some embodiments an additional option where the user indicates inability to perceive a difference is also included. The process flow may include one or more rounds, and may be binary or trinary decision flows, or a round robin-based process. By implementing these process flows, audio device configuration application 150 may configure audio parameters more efficiently.

Figure 5:
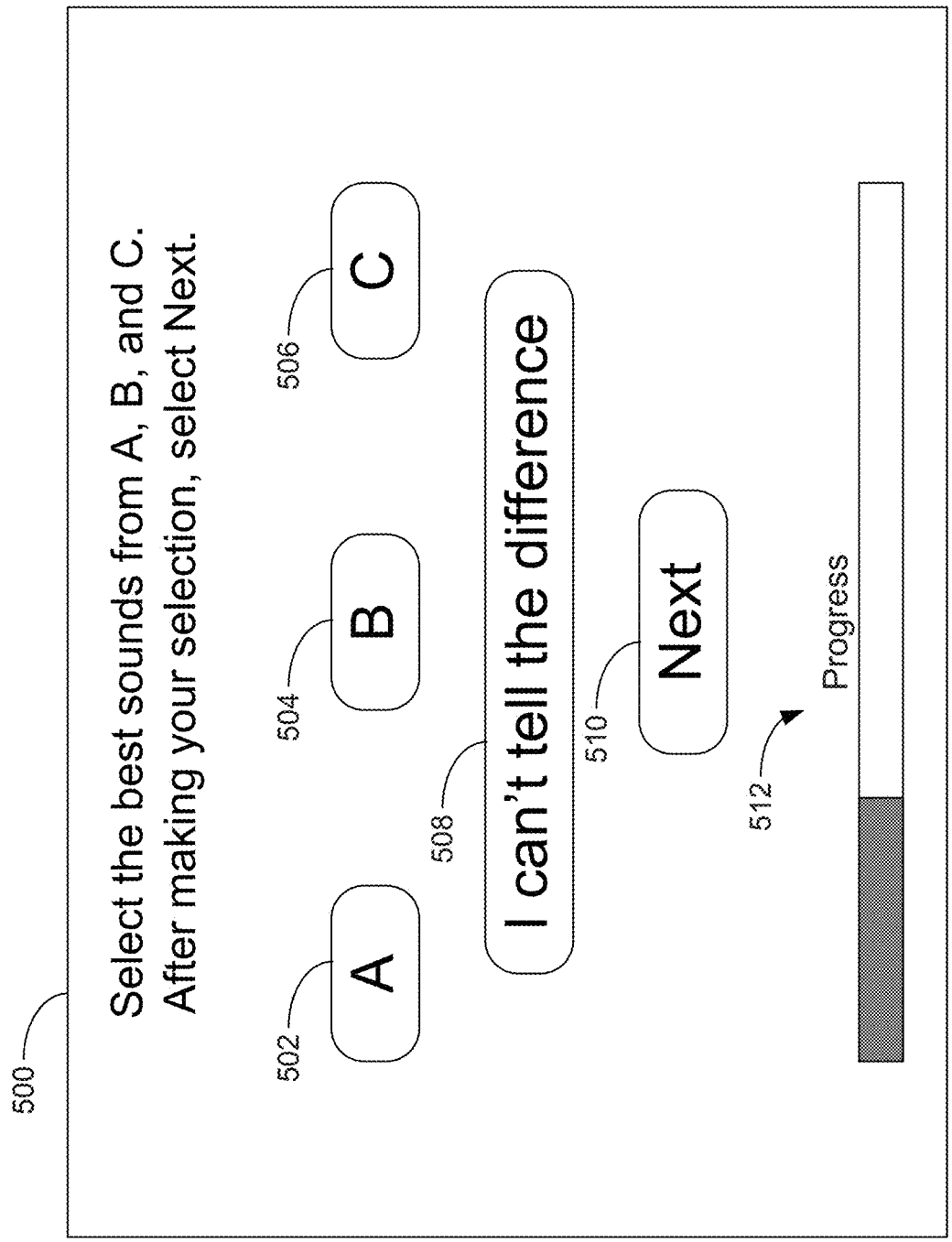
FIG. 5 illustrates an example user interface for presenting options for configuring one or more audio parameters, according to one or more aspects of the various embodiments.

FIG. 5 illustrates an example user interface for presenting options for configuring one or more audio parameters, according to one or more aspects of the various embodiments. User interface 500 may be displayed by audio device configuration application 150 via display 132. A user may interact with user interface 500 via input device 134.

User interface 500 illustrates a presentation of three options corresponding to a change or no change (e.g., options presented in one iteration of decision flow 200), along with a fourth option. User interface 500 includes Option A 502, Option B 504, and Option C 506. These options correspond to the three options in an iteration of decision flow 200. For example, Option A 502 may correspond to option 202-A, Option B 504 may correspond to option 202-B, and Option C 506 may correspond to option 202-C. Additionally, user interface 500 includes a fourth option 508, where the user indicates that he cannot tell the difference between the values corresponding to options 502, 504, and 506. After the user has selected one of options 502, 504, 506, and 508, the user may select "Next" 510 to advance to the next iteration. Also, user interface 500 includes a progress indicator 512 (e.g., a progress bar) indicating how far along is the user in the process flow. Before "Next" 510 is selected, audio device configuration application 150 may play demonstration audio content 156 based on a selected option amongst options 502, 504, 506, and 508, or a lack of a selection (e.g., before the user has made a selection). Additionally, in some embodiments, "Next" 510 may be disabled until the user has selected one of options 502, 504, 506, and 508.

It should be appreciated that while user interface 500 presents three options plus a fourth option for indicating inability to perceive a difference, a similar user interface may present two options A and B (e.g., a user interface for decision flows 300, 320, or a user interface for presenting a pair of value combinations in matrix 400) and optionally a third option for indicating inability to perceive a difference.

FIG. 6 illustrates further examples of user interfaces for presenting options for configuring one or more audio parameters, according to one or more aspects of the various embodiments. FIG. 6 illustrates a sequence of user interfaces 602, 604, and 606 in one round in a process flow in which the user configures one or more audio parameters three times, each time based on different content items included in demonstration audio content 156.

User interface 602 illustrates a first user interface in a sequence corresponding to the first iteration of a of a process flow for configuring two audio parameters based on a first content item included in demonstration audio content 156. Track indicator 608 indicates which content item included in demonstration audio content 156 is being used (and played) for configuring the audio parameter(s). As shown in user interfaces 602, 604, and 606, a first demonstration audio content is being used, as indicated by track indicator 608. User interface 602 includes two objects 612 and 614. Object 612 correspond to a first audio parameter, and includes options A, B, and C along a semicircle arc. One option amongst the three options corresponds to no change. The other two options may correspond to a plus change (increase) by a predefined magnitude (absolute value) M for the iteration and a minus change (decrease) by the predefined magnitude M, respectively. The semicircle arc represents the range of possible change for the audio parameter. The middle of the semicircle arc, where option B is located in object 612-A, represents no change from the initial value of the audio parameter for the process flow. The left end and the right end of the semicircle arc, where options A and C are located in object 612-A, respectively, represent the maximum possible change in the minus and plus directions, respectively, from the initial value of the audio parameter for the process flow. Thus, in object 612-A, option B corresponds to no change from the initial value, option A corresponds to a decrease from the initial value by the maximum magnitude, and option C corresponds to an increase from the initial value by the maximum magnitude. That is, the predefined magnitude M for object 612-A is the maximum possible change in one direction. Similarly, object 614 corresponds to a second audio parameter, and also includes its own options A, B, C on a semicircle arc. M for object 614-A is also the maximum possible change in one direction. Iteration indicator 620 indicates the iteration with which the current user interface is associated.

The user may make a selection in either or both of objects 612-A and 614-A (e.g., by tapping or clicking on the desired option via input device 134). As shown in FIG. 6, in user interface 602, option B in object 612-A is selected, as indicated by the darker color shade compared to options A and C in object 612-A. In some embodiments, the object corresponding to an audio parameter not being currently manipulated may be faded or greyed out. For example, in user interface 602, object 614-A is faded. The user may manipulate object 614-A to configure the second audio parameter by first selecting object 614-A (e.g., tapping or clicking on object 614-A via input device 134) to activate object 614-A (and deactivating object 612-A in the process, while retaining any selection already made in object 612-A), and then selecting one of options A, B, or C in object 614-A. As shown, option C in object 614-A is selected. After the user has made at least one selection in object 612-A or 614-A, the user may select "Next section" 616 to advance to the second iteration.

In the second iteration of the process flow, user interface 604 includes objects 612-B and 614-B. In object 612-B, option B, again at the middle of the semicircle arc, corresponds to no change from the initial value for the process flow. Options A and C, located at positions closer to the middle of semicircle arc compared to object 612-A, correspond to -N and +N, respectively, where N is a predefined magnitude (absolute value) of change for the second iteration, and N is smaller than M for objects 612-A and 614-A described above. In object 614-B, option C corresponds to no change from the selection in the first iteration, which is the maximum plus change from the initial value. Options A and B correspond to -2N and -N, respectively, from the selection in the first iteration. In some embodiments, if the option selected in one iteration corresponds to a maximum magnitude of change of the parameter, as with option C in object 614-A described above, then in the next iteration, the options do not center around the option selected in the last iteration but instead increase or decrease from the last selected option by the predefined magnitude and two times the predefined magnitude, respectively, as with options A and B in object 614-B. User interface 604 as shown indicates a selection of option B in object 614-B and no selection in object 612-B. In some embodiments, a lack of selection (e.g., as in object 612-B) is treated by audio device configuration application 150 as the equivalent of a selection of an option indicating that the user could not perceive a difference, similar to option 508 described above.

In the third iteration, user interface 606 includes objects 612-C and 614-C. In object 612-C, the options remained in place in response to a lack of selection in object 612-B; the lack of selection in object 612-B indicated that the user could not perceive a difference between options A, B, and C in object 612-B. In object 614-C, option B corresponds to no change from the selection in the second iteration, and options A and C correspond to -P and +P, respectively, where P is a predefined magnitude of change (absolute value) for the third iteration, and P is smaller than N. User interface 606 as shown indicates a selection of option B in object 614-C and no selection in object 612-C. The user may then finish configuration based on the first demonstration audio content and advance to configuration based on a second demonstration audio content by selecting "Next track" 618. In response to selection of "Next track" 618, audio device configuration application 150 saves the results of the process flow based on the first demonstration audio content (e.g., the cumulative result of selections for object 612 and 614, as shown in user interface 606), and advances to a run of the process flow that is based on the second demonstration audio content. The user may instead forego configuration based on a second demonstration audio content and set the audio parameter(s) based on the selections up to that point by selecting "Finish here" 622.

Accordingly, user interfaces 602, 604, and 606 illustrate example user interfaces for a process flow in which two audio parameters may be configured concurrently. In some embodiments, in user interfaces 602, 604, and 606, the user may select an option for either or both audio parameters in each iteration—the user is not mandated to select an option for both audio parameters in each iteration. Further, in some embodiments, as noted above, the same audio parameter(s) may be configured multiple times (e.g., the user goes through the process flow multiple times), with each run of the process flow using the same or different content item included in demonstration audio content 156. At the end of the multiple runs of the process flow, the results for an audio parameter from the multiple runs of the process flow may be averaged together and that average is set as the value for audio parameter for storing in personalized audio parameter 154.

In some embodiments, at the end of a process flow, the user may be presented with a user interface in which the user may play demonstration audio content 156 with the audio parameter configured as a result of the process flow, to save the audio parameter configuration result in personalized audio parameter 154, to apply the audio parameter configuration result to audio output device 136, to discard the audio parameter configuration result and start over, or to access advanced options, which may include manual controls (e.g., sliders) for configuring the audio parameter manually (e.g., fine tuning configuration).

Figure 7:
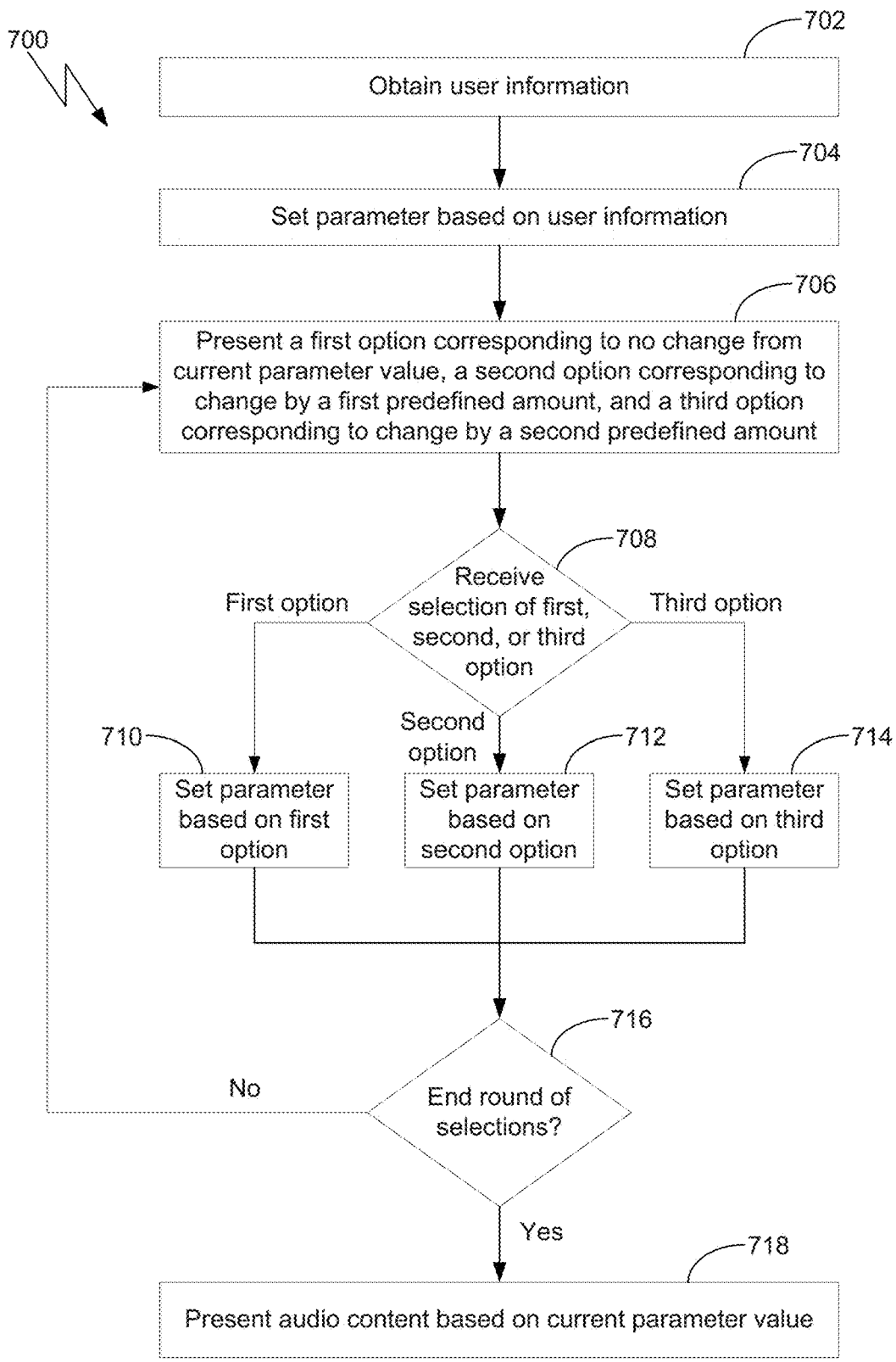
FIG. 7 illustrates a flowchart of method steps for configuring one or more audio parameters, according to one or more aspects of the various embodiments.

FIG. 7 illustrates a flowchart of method steps for configuring one or more audio parameters, according to one or more aspects of the various embodiments. Although the method steps are described in conjunction with the systems of FIGS. 1-6, persons skilled in the art will understand that any system configured to perform the method steps, in any order, falls within the scope of the various embodiments.

As shown in FIG. 7, a method 700 begins at step 702, where audio device configuration application 150 obtains user information. Audio device configuration application 150 may present one or more user interfaces via display 132 in which the user is asked to provide demographic information (e.g., age, sex, etc.). The user may provide the information or decline to provide the information.

At step 704, audio device configuration application 150 sets an audio parameter based on the user information. For example, audio device configuration application 150 may apply a model included in audio parameter baseline 152 to the user information to set an initial value for the audio parameter. If the user declined to provide the user information, or the user information is incomplete, audio device configuration application 150 may set an initial value for the audio parameter based on default values included in audio parameter baseline 152.

At step 706, audio device configuration application 150 presents a first option corresponding to no change from the current value of the audio parameter, a second option corresponding to change by a first predefined amount, and a third option corresponding to change by a second predefined amount. For example, audio device configuration application 150 may present options A, B, and C (e.g., options 202-A, 202-B, and 202-C), where A corresponds to +X from the current value, B corresponds to +/−0, and C corresponds to −X from the current value.

At step 708, audio device configuration application 150 receives a selection of one of the first, second, and third options. If selection of the first option was received, then at step 710 audio device configuration application 150 sets the audio parameter based on the first option. If selection of the second option was received, then at step 712 audio device configuration application 150 sets the audio parameter based on the second option. If selection of the third option was received, then at step 714 audio device configuration application 150 sets the audio parameter based on the third option. For example, if option 202-A (FIG. 2) was selected, audio device configuration application 150 may set the audio parameter to −4 from the current value. In some embodiments, instead of setting the audio parameter immediately, audio device configuration application 150 may accumulate the selections until the end of the round before setting the audio parameter.

At step 716, if the current round has not ended (there are still more selection iterations in the current round), then method 700 returns to step 706, where three options are presented in another iteration. These three options may differ from options in the previous iteration by the amount of change. For example, options 204 include changes of +/−3 vs. options 202, which include changes of +/−4. If the current round has ended (there are no more selection iterations in the current round), then method 700 proceeds to step 718, where audio device configuration application 150 presents (e.g., plays) audio content (e.g., demonstration audio content 156) via audio output device 136 based on the current parameter value. Audio device configuration application 150 may set the value of the audio parameter based on the selections received in step 708 in the multiple iterations, and play demonstration audio content 156 based on that set audio parameter value.

Figure 8:
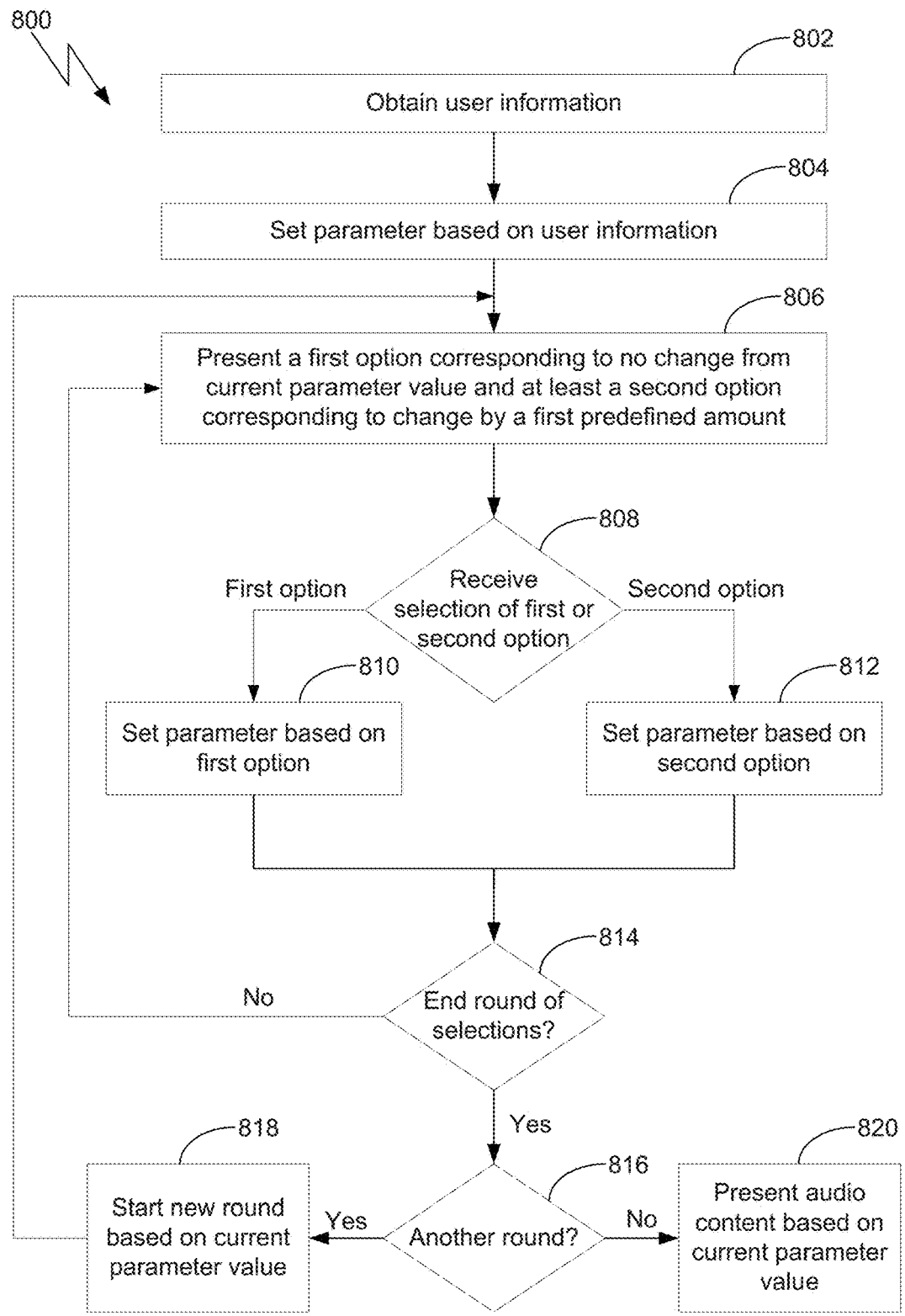
FIG. 8 illustrates another flowchart of method steps for configuring one or more audio parameters, according to one or more aspects of the various embodiments.

FIG. 8 illustrates another flowchart of method steps for configuring one or more audio parameters, according to one or more aspects of the various embodiments. Although the method steps are described in conjunction with the systems of FIGS. 1-6, persons skilled in the art will understand that any system configured to perform the method steps, in any order, falls within the scope of the various embodiments.

As shown in FIG. 8, a method 800 begins at step 802, where audio device configuration application 150 obtains user information. At step 804, audio device configuration application 150 sets an audio parameter based on the user information. Steps 802 and 804 are similar to steps 702 and 704, respectively, described above in conjunction with method 700.

At step 806, audio device configuration application 150 presents a first option corresponding to no change from the current value of the audio parameter and a second option corresponding to change by a first predefined amount. For example, audio device configuration application 150 may present options A and B (e.g., options 302-A, 302-B), where A corresponds to one of +X or −X from the current value, and B corresponds to +/−0.

At step 808, audio device configuration application 150 receives a selection of one of the first and second options. If selection of the first option was received, then at step 810 audio device configuration application 150 sets the audio parameter based on the first option. If selection of the second option was received, then at step 812 audio device configuration application 150 sets the audio parameter based on the second option. For example, if option 302-A (FIG. 3A) was selected, audio device configuration application 150 may set the audio parameter to +/−0 from the current value. In some embodiments, instead of setting the audio parameter immediately, audio device configuration application 150 may accumulate the selections until the end of the round before setting the audio parameter.

At step 814, if the current round has not ended (there are still more selection iterations in the current round), then method 800 returns to step 806, where two options are presented in another iteration. These two options may differ from options in the previous iteration by the amount of change. For example, options 304 include −6 and 0, vs. options 302, which include +6 and 0. If the current round has ended (there are no more selection iterations in the current round), then method 700 proceeds to step 816.

At step 816, if there are additional rounds of selections remaining, then method 800 proceeds to step 818, where audio device configuration application 150 starts a new round based on the current value of the audio parameter set as a result of the completed round. For example, decision flow 320 starts with start 322, where the audio parameter is set to the value set at end 310 of decision flow 300. If there are no more rounds of selections remaining, then method 800 proceeds to step 820, where audio device configuration application 150 presents (e.g., plays) audio content (e.g., a content item included in demonstration audio content 156) via audio output device 136 based on the current parameter value. Audio device configuration application 150 may set the value of the audio parameter based on the selections received in step 808 in the multiple iterations of the completed rounds of selections, and play demonstration audio content 156 based on that set audio parameter value.

Figure 9:
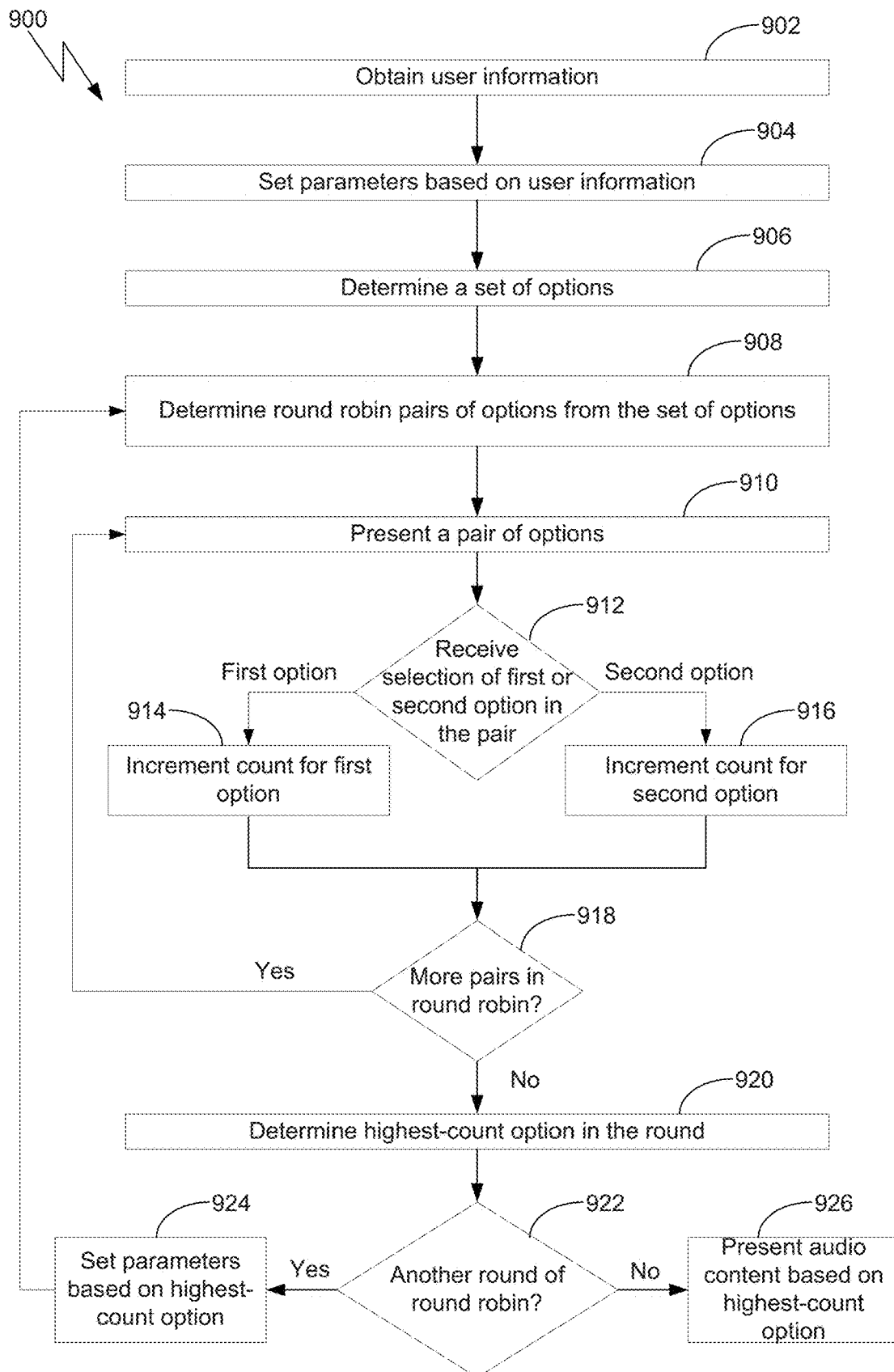
FIG. 9 illustrates a further flowchart of method steps for configuring one or more audio parameters, according to one or more aspects of the various embodiments.

FIG. 9 illustrates a further flowchart of method steps for configuring one or more audio parameters, according to one or more aspects of the various embodiments. Although the method steps are described in conjunction with the systems of FIGS. 1-6, persons skilled in the art will understand that any system configured to perform the method steps, in any order, falls within the scope of the various embodiments.

As shown in FIG. 9, a method 900 begins at step 902, where audio device configuration application 150 obtains user information. At step 904, audio device configuration application 150 sets initial values for two or more audio parameters based on the user information. Steps 902 and 904 are similar to steps 702 and 704, respectively, described above in conjunction with method 700.

At step 906, audio device configuration application 150 determines a set of options. Audio device configuration application 150 may determine a set of value combinations for the audio parameters to be configured. The set of value combinations include combinations of values across the ranges of possible values for the audio parameters, in predefined increments. The set of value combinations may be represented as a matrix of the value combinations (e.g., matrix 400).

At step 908, audio device configuration application 150 determines round robin pairs of options from the set of options. Audio device configuration application 150 determines the pairs of options from the set of options that will be presented in a current round of round robin selections. For example, the candidate value combinations that may be presented in the round robin pairs include the value combination in the set of options (e.g., as represented by matrix 400) closest to the initial values set in step 904, and the value combinations in matrix 400 immediately adjacent to the value combination closest to the initial values. The round robin pairs are determined from the set of candidate value combinations—each candidate pairs against each other candidate once, forming the round robin pairs.

At step 910, audio device configuration application 150 presents a pair of options. Audio device configuration application 150 presents a pair in the round robin pairs to the user. At step 912, audio device configuration application 150 receives a selection of one of pair of options. If selection of a first option in the pair was received, then at step 914 audio device configuration application 150 increments a count for the first option. If selection of a second option in the pair was received, then at step 916 audio device configuration application 150 increments a count for the first option. The count for an option in the round robin round tracks the number of times the option was selected in the round.

At step 918, if there are more pairs of options in the round robin round (i.e., there are pairs amongst the round robin pairs that have not been presented yet), then method 900 proceeds back to step 910, where audio device configuration application 150 presents another pair of options. If there are no more pairs of options in the round robin round, then method 900 proceeds to step 920.

At step 920, audio device configuration application 150 determines the option in the current round robin round with the highest count. Audio device configuration application 150 determines the winner of the round robin round amongst the candidate value combinations based on the selection counts (e.g., as incremented in step 914 and/or 916) of the candidates. The candidate with the highest selection count is the winner of the round.

At step 922, audio device configuration application 150 determines if there is to be another round of round robin. Audio device configuration application 150 makes this determination based on whether there are any not-rejected candidates in the matrix of options (e.g., matrix 400) immediately adjacent to the winner determined in step 920. If there are adjacent not-rejected candidates, then there will be another round of round robin. If there are no adjacent not-rejected candidates, then there will be no more rounds of round robin.

If, at step 922, audio device configuration application 150 determines that there is to be another round of round robin, then method 900 proceeds to step 924, where audio device configuration application 150 sets the audio parameters based on the highest-count option. Audio device configuration application 150 starts a next round of round robin, with the initial values of the audio parameters for the next round set based on the winner determined in step 920. Method 900 then proceeds back to step 908, where audio device configuration application 150 determines the round robin pairs of options for the next round based on non-rejected candidates adjacent to the winner, determined in step 920, in the matrix representing the set of options.

If, at step 922, audio device configuration application 150 determines that there are no more rounds of round robin, then method 900 proceeds to step 926, where audio device configuration application 150 presents (e.g., plays) audio content (e.g., demonstration audio content 156) via audio output device 136 based on the highest-count option (i.e., the winner determined in step 920). Audio device configuration application 150 may set the values of the audio parameters based on the winner, and play demonstration audio content 156 based on those set audio parameter values.

In sum, the disclosed techniques efficiently personalize audio parameters that control the operation of an audio device. A configuration application sets a baseline value as the value for a given audio parameter. The baseline value may be selected based on a predefined model or a predefined value. The configuration application then presents a first set of options. The first set of options include a first option corresponding to no change from the current value for the parameter and at least a second option corresponding to a change from the current value by a first predefined amount. Based on a selection of the first option or the second option, the configuration application presents a second set of options. The second set of options include a third option corresponding to no change from the value derived from the selection of the first option or the second option, and a fourth option corresponding to a change from the value derived from the selection of the first option or the second option by a second predefined amount. The configuration application sets a value for the parameter based at least on a selection of the third option or the fourth option.

An advantage and technological improvement of the disclosed techniques is that a personalized audio parameter may be derived and configured systematically and in a targeted manner. The audio parameter is not derived in a trial and error fashion, but rather in a regulated, personalized way. Accordingly, the audio parameters may be set in a more efficient and effective manner. Another advantage and technological improvement of the disclosed techniques is that a baseline for audio parameters may be refined based on personalized audio parameters. The refined baseline may be distributed and applied to audio devices associated with different users.

1. In some embodiments, a computer-implemented method comprises presenting a first plurality of setting options associated with an audio parameter, wherein the first plurality of setting options comprises a first option having a same value as a first setting of the audio parameter and a second option having a first value different than the first setting; receiving a selection of one of the first option and the second option; based on the selection, presenting a second plurality of setting options associated with the audio parameter, wherein the second plurality of setting options comprises a third option having a same value as a second setting of the audio parameter and a fourth option having a second value different than the second setting; and setting the audio parameter based on a selection of at least one of the second plurality of setting options.

2. The method of clause 1, further comprising playing an audio content item based on the audio parameter.

3. The method of clauses 1 or 2, wherein the first plurality of setting options further comprises a fifth option having a third value different than the first setting, and wherein receiving the selection comprises receiving the selection of one of the first option, the second option, and the fifth option.

4. The method of any of clauses 1-3, wherein the second plurality of setting options further comprises a sixth option having a fourth value different than the second setting.

5. The method of any of clauses 1-4, wherein the first value corresponds to a change from the first setting by a first magnitude, and the second value corresponds to a change from the second setting by a second magnitude.

6. The method of any of clauses 1-5, wherein the second magnitude is smaller than the first magnitude.

7. The method of any of clauses 1-6, wherein the second magnitude is the same as the first magnitude.

8. The method of any of clauses 1-7, wherein the first value corresponds to an addition by the first magnitude, and the second value corresponds to a subtraction by the second magnitude.

9. The method of any of clauses 1-8, wherein the first value corresponds to an addition by the first magnitude, and the second value corresponds to an addition by the second magnitude.

10. The method of any of clauses 1-9, wherein the first value corresponds to a subtraction by the first magnitude, and the second value corresponds to a subtraction by the second magnitude.

11. In some embodiments, one or more non-transitory computer readable media store instructions that, when executed by one or more processors, cause the one or more processors to perform the steps of presenting a first plurality of setting options associated with an audio parameter, wherein the first plurality of setting options comprises a first option associated with a first setting of the audio parameter and a second option associated with a second setting of the audio parameter; receiving a selection of one of the first option and the second option; based on the selection, presenting a second plurality of setting options associated with the audio parameter, wherein the second plurality of setting options comprises a third option associated with a third setting of the audio parameter and a fourth option associated with a fourth setting of the audio parameter; and setting the audio parameter based on a selection of at least one of the second plurality of setting options.

12. The one or more computer readable media of clause 11, wherein the first plurality of setting options further comprises a fifth option associated with a fifth setting of the audio parameter, and wherein receiving the selection comprises receiving the selection of one of the first option, the second option, and the fifth option.

13. The one or more computer readable media of clause 11 or 12, wherein the second plurality of setting options further comprises a sixth option associated with a sixth setting of the audio parameter.

14. The one or more computer readable media of any of clauses 11-13, wherein the first setting comprises a first value, and the second setting comprises a second value, and wherein the second value corresponds to a change from the first value by a magnitude.

15. The one or more computer readable media of any of clauses 11-14, wherein the second value corresponds to a decrease from the first value by the magnitude.

16. The one or more computer readable media of any of clauses 11-15, wherein the second value corresponds to an increase from the first value by the magnitude.

17. In some embodiments, a system comprises a memory storing instructions; and a processor that is coupled to the memory and, when executing the instructions, is configured to present a first plurality of setting options associated with an audio parameter, wherein the first plurality of setting options comprises a first option having a same value as a first setting of the audio parameter and a second option having a first value different than the first setting; receive a selection of one of the first option and the second option; based on the selection, present a second plurality of setting options associated with the audio parameter, wherein the second plurality of setting options comprises a third option having a same value as a second setting of the audio parameter and a fourth option having a second value different than the second setting; and set the audio parameter based on a selection of at least one of the second plurality of setting options.

18. The system of clause 17, wherein the first value corresponds to a change from the first setting by a first magnitude, and the second value corresponds to a change from the second setting by a second magnitude.

19. The system of clauses 17 or 18, wherein the second magnitude is smaller than the first magnitude.

20. The system of any of clauses 17-19, wherein the second magnitude is the same as the first magnitude.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    obtaining demonstration audio content having a broad range of audio properties;
    outputting audio corresponding to the demonstration audio content via an audio output device with an equalization setting automatically set according to a first setting option, wherein the first setting option has a same value as a first equalization setting, wherein the equalization setting comprises a setting for at least one of a treble or a bass frequency range; and
    outputting audio corresponding to the demonstration audio content via the audio output device with the equalization setting automatically set according to a second setting option, wherein the second setting option has a first value different than the first equalization setting;
    upon presenting the first setting option and the second setting option via a user interface, receiving a selection of one of the first setting option or the second setting option;
    based on the selection of one of the first setting option or the second setting option via the user interface:
        outputting audio corresponding to the demonstration audio content via the audio output device with the equalization setting automatically set according to a third setting option, wherein the third setting option has a same value as a second equalization setting, wherein the second equalization setting is different from the first equalization setting, and wherein the second equalization setting depends on the selection of the first setting option or the second setting option; and
        outputting audio corresponding to the demonstration audio content via the audio output device with the equalization setting automatically set according to a fourth setting option, wherein the fourth setting option has a second value different than the second equalization setting;
    setting the equalization setting based on a selection of one of the third setting option or the fourth setting option, the selection being received via the user interface; and
    outputting an audio content item via the audio output device based on the set equalization setting.

2. The method of claim 1, further comprising outputting audio corresponding to the demonstration audio content via the audio output device with the equalization setting set according to a fifth setting option, wherein the fifth setting option has a third value different than the first equalization setting, and wherein receiving the selection comprises receiving the selection of one of the first setting option, the second setting option, or the fifth setting option.

3. The method of claim 1, further comprising outputting audio corresponding to the demonstration audio content via the audio output device with the equalization setting set according to a sixth setting option, wherein the sixth setting option has a fourth value different than the second equalization setting, and wherein setting the equalization setting comprises setting the equalization setting based on the selection of one of the third setting option, the fourth setting option, or the sixth setting option.

4. The method of claim 1, wherein the first value corresponds to a change from the first equalization setting by a first magnitude, and the second value corresponds to a change from the second equalization setting by a second magnitude.

5. The method of claim 4, wherein the second magnitude is smaller than the first magnitude.

6. The method of claim 4, wherein the second magnitude is the same as the first magnitude.

7. The method of claim 4, wherein the first value corresponds to an addition by the first magnitude, and the second value corresponds to a subtraction by the second magnitude.

8. The method of claim 4, wherein the first value corresponds to an addition by the first magnitude, and the second value corresponds to an addition by the second magnitude.

9. The method of claim 4, wherein the first value corresponds to a subtraction by the first magnitude, and the second value corresponds to a subtraction by the second magnitude.

10. One or more non-transitory computer readable media storing instructions that, when executed by one or more processors, cause the one or more processors to perform the steps of:
   obtaining demonstration audio content having a broad range of audio properties;
   outputting audio corresponding to the demonstration audio content via an audio output device with an equalization setting automatically set according to a first setting option associated with a first setting of the equalization setting, wherein the equalization setting comprises a setting for at least one of a treble or a bass frequency range; and
   outputting audio corresponding to the demonstration audio content via the audio output device with the equalization setting automatically set according to a second setting option associated with a second setting of the equalization setting;
   upon presenting the first setting option and the second setting option via a user interface, receiving a selection of one of the first setting option or the second setting option;
   based on the selection of one of the first setting option or the second setting option via the user interface:
      outputting audio corresponding to the demonstration audio content via the audio output device with the equalization setting automatically set according to a third setting option associated with a third setting of the equalization setting, wherein the second setting of the equalization setting is different from the first setting of the equalization setting, and wherein the second setting of the equalization setting depends on the selection of the first setting option or the second setting option; and
      outputting audio corresponding to the demonstration audio content via the audio output device with the equalization setting automatically set according to a fourth setting option associated with a fourth setting of the equalization setting;
   setting the equalization setting based on a selection of one of the third setting option or the fourth setting option, the selection being received via the user interface; and
   outputting an audio content item via the audio output device based on the set equalization setting.

11. The one or more non-transitory computer readable media of claim 10, wherein the steps further comprise outputting audio corresponding to the demonstration audio content via the audio output device with the equalization setting set according to a fifth setting option associated with a fifth setting of the equalization setting, and wherein receiving the selection comprises receiving the selection of one of the first setting option, the second setting option, or the fifth setting option.

12. The one or more non-transitory computer readable media of claim 10, wherein the steps further comprise outputting audio corresponding to the demonstration audio content via the audio output device with the equalization setting set according to a sixth setting option associated with a sixth setting of the equalization setting, and wherein setting the equalization setting comprises setting the equalization setting based on the selection of one of the third setting option, the fourth setting option, or the sixth setting option.

13. The one or more non-transitory computer readable media of claim 10, wherein the first setting comprises a first value, and the second setting comprises a second value, and wherein the second value corresponds to a change from the first value by a magnitude.

14. The one or more non-transitory computer readable media of claim 13, wherein the second value corresponds to a decrease from the first value by the magnitude.

15. The one or more non-transitory computer readable media of claim 13, wherein the second value corresponds to an increase from the first value by the magnitude.

16. A system, comprising:
   a memory storing instructions; and
   a processor that is coupled to the memory and, when executing the instructions, is configured to:
      obtaining demonstration audio content having a broad range of audio properties;
      output audio corresponding to the demonstration audio content via an audio output device with an equalization setting automatically set according to a first setting option, wherein the first setting option has a same value as a first setting of the equalization setting, wherein the equalization setting comprises a setting for at least one of a treble or a bass frequency range; and
      output audio corresponding to the demonstration audio content via the audio output device with the equalization setting automatically set according to a second setting option, wherein the second setting option has a first value different than the first setting;
      upon presenting the first setting option and the second setting option via a user interface, receive a selection of one of the first setting option or the second setting option;
      based on the selection of one of the first setting option or the second setting option via the user interface:
         output audio corresponding to the demonstration audio content via the audio output device with the equalization setting automatically set according to a third setting option, wherein the third setting option has a same value as a second setting of the equalization setting, wherein the second setting of the equalization setting is different from the first setting of the equalization setting, and wherein the second setting of the equalization setting depends on the selection of the first setting option or the second setting option; and
         output audio corresponding to the demonstration audio content via the audio output device with the equalization setting automatically set according to a fourth setting option, wherein the fourth setting option has a second value different than the second setting;
      set the equalization setting based on a selection of one of the third setting option or the fourth setting option, the selection being received via the user interface; and output an audio content item via the audio output device based on the set equalization setting.

17. The system of claim 16, wherein the first value corresponds to a change from the first setting by a first magnitude, and the second value corresponds to a change from the second setting by a second magnitude.

18. The system of claim 17, wherein the second magnitude is smaller than the first magnitude.

19. The system of claim 17, wherein the second magnitude is the same as the first magnitude.

* * * * *